United States Patent
Somogyi et al.

(10) Patent No.: US 7,640,535 B2
(45) Date of Patent: *Dec. 29, 2009

(54) METHOD FOR TRANSACTION PROCESSING WITH PARALLEL EXECUTION

(75) Inventors: Alexander J. Somogyi, Bernardsville, NJ (US); Adam Messinger, San Francisco, CA (US); Anno R. Langen, Berkeley, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 969 days.

This patent is subject to a terminal disclaimer.

(21) Appl. No.: 10/762,944

(22) Filed: Jan. 22, 2004

(65) Prior Publication Data

US 2004/0216107 A1 Oct. 28, 2004

Related U.S. Application Data (60) Provisional application No. 60/442,319, filed on Jan. 24, 2003.

(51) Int. Cl.
 G06F 9/44 (2006.01)
 G06F 9/46 (2006.01)
(52) U.S. Cl. ................... 717/119; 718/100; 718/101; 705/8
(58) Field of Classification Search ............ 717/101, 717/148, 106, 100, 103, 119, 149, 175, 177; 714/758; 718/100, 101; 705/8
See application file for complete search history.

(56) References Cited

U.S. PATENT DOCUMENTS 5,335,343 A * 8/1994 Lampson et al. ............ 714/19
5,815,727 A * 9/1998 Motomura ................. 712/1
5,884,327 A    3/1999 Cotner
5,991,792 A   11/1999 Nageswaran
6,237,024 B1   5/2001 Wollrath
6,298,370 B1 * 10/2001 Tang et al. ................. 718/102
6,349,295 B1   2/2002 Tedesco et al.
6,567,838 B1   5/2003 Korenshtein (Continued)

OTHER PUBLICATIONS

Jayant R. Haritsa, The PROMPT Real-Time Commit Protocol, Feb. 2000, IEEE Transactions on Parallel and Distributed Systems, vol. 11, No. 2, p. 162.*

(Continued)

*Primary Examiner*—Wei Y Zhen
*Assistant Examiner*—Chih-Ching Chow
(74) *Attorney, Agent, or Firm*—Fliesler Meyer LLP (57) ABSTRACT

A method for using available server threads to process resources and reduce the overall time of performing XA interactions in two-phase commit protocol implemented by the transaction manager. A TM processing XA interactions dispatches interaction commands for multiple resources to a thread manager, which dispatches the commands to idle server threads. In one embodiment, the TM attempts to dispatch all but one of the interaction commands to separate threads. The primary thread then processes the remaining resource command. Any commands relating to dispatch requests that were unable to be dispatched to separate threads due to unavailability are processed by the primary thread. Once the primary server has processed its interaction commands and received a signal indicating the threads receiving dispatch requests have completed their respective processing of dispatched commands, the next group of commands is processed in a similar manner.

19 Claims, 8 Drawing Sheets

U.S. PATENT DOCUMENTS

| | | |
|---|---|---|
| 6,671,686 B2 | 12/2003 | Pardon et al. |
| 6,823,356 B1 | 11/2004 | Novaes |
| 6,898,617 B2 * | 5/2005 | Doolittle et al. ............. 709/201 |
| 7,290,056 B1 * | 10/2007 | McLaughlin, Jr. .......... 709/230 |
| 2002/0178177 A1 | 11/2002 | Park et al. |
| 2002/0194377 A1 * | 12/2002 | Doolittle et al. ............. 709/246 |
| 2003/0001572 A1 | 1/2003 | Chessell |
| 2003/0004774 A1 * | 1/2003 | Greene et al. ................. 705/8 |
| 2003/0115276 A1 | 6/2003 | Flaherty |
| 2003/0145021 A1 | 7/2003 | Parkinnen |
| 2003/0188163 A1 | 10/2003 | Fischer |
| 2004/0003372 A1 | 1/2004 | Sato |
| 2004/0010551 A1 | 1/2004 | Dorland |
| 2004/0107381 A1 * | 6/2004 | Bomfim et al. ................ 714/4 |

OTHER PUBLICATIONS

Oracle8i Concepts Release 8.1.5/ Parallel Execution. Copyright 1999. Oracle Corporation. http://www.cs.umbc.edu/help/oracle8/server.815/a67781/c22para1.htm.*

Sun Microsystems, Inc., Java™ 2 Platform Enterprise Edition Specification, v1.3, Jul. 27, 2001, http://java.sun.com/j2ee/j2ee-1_3-fr-spec.pdf.

Sun Microsystems, Inc., Java Transaction API (JTA) Specification, v1.0.1, Apr. 29, 1999, http://java.sun.com/products/jta.

The Open Group, Distributed Transaction Processing: The XA Specification, Dec. 1991, www.opengroup.org/products/publications/catalog/c193.htm.

* cited by examiner

METHOD FOR TRANSACTION PROCESSING WITH PARALLEL EXECUTION

CLAIM TO PRIORITY

The present application claims the benefit of priority under 35 U.S.C. §119(e) to U.S. Provisional Patent Application entitled "PARALLEL TRANSACTION EXECUTION USING JTA INTERFACE" Ser. No. 60/442,319, filed on Jan. 24, 2003, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to XA interactions in JAVA® Transaction API, and more particularly to parallel transaction processing in XA interactions in JAVA® Transaction API.

BACKGROUND OF THE INVENTION

JAVA® standards for web services are constantly being developed. Concurrently, businesses are building important applications on top of web services infrastructures, such as that available in WebLogic Server from BEA Systems of San Jose, Calif. As these applications evolve, they become more complex with more operations to perform. In many implementations, a server may perform transactions involving multiple resources. Transactional guarantees when making updates to the resources are important and should be performed as quickly as possible.

The WebLogic Server (WLS) Transaction Manager (TM) provides a full-featured two-phase commit transaction engine that implements the JAVA® Transaction API (JTA) specification. JAVA® 2 Enterprise Edition (J2EE) applications deployed on WLS make use of the TM and the JTA interfaces to effect atomic, persistent changes to data that are managed by one or more transactional resources. Transactional resources, such as RDBMS and messaging systems, support the XAResource interface as defined by the JTA specification. A representative server-resource system 100 is illustrated in FIG. 1.

Figure 1:
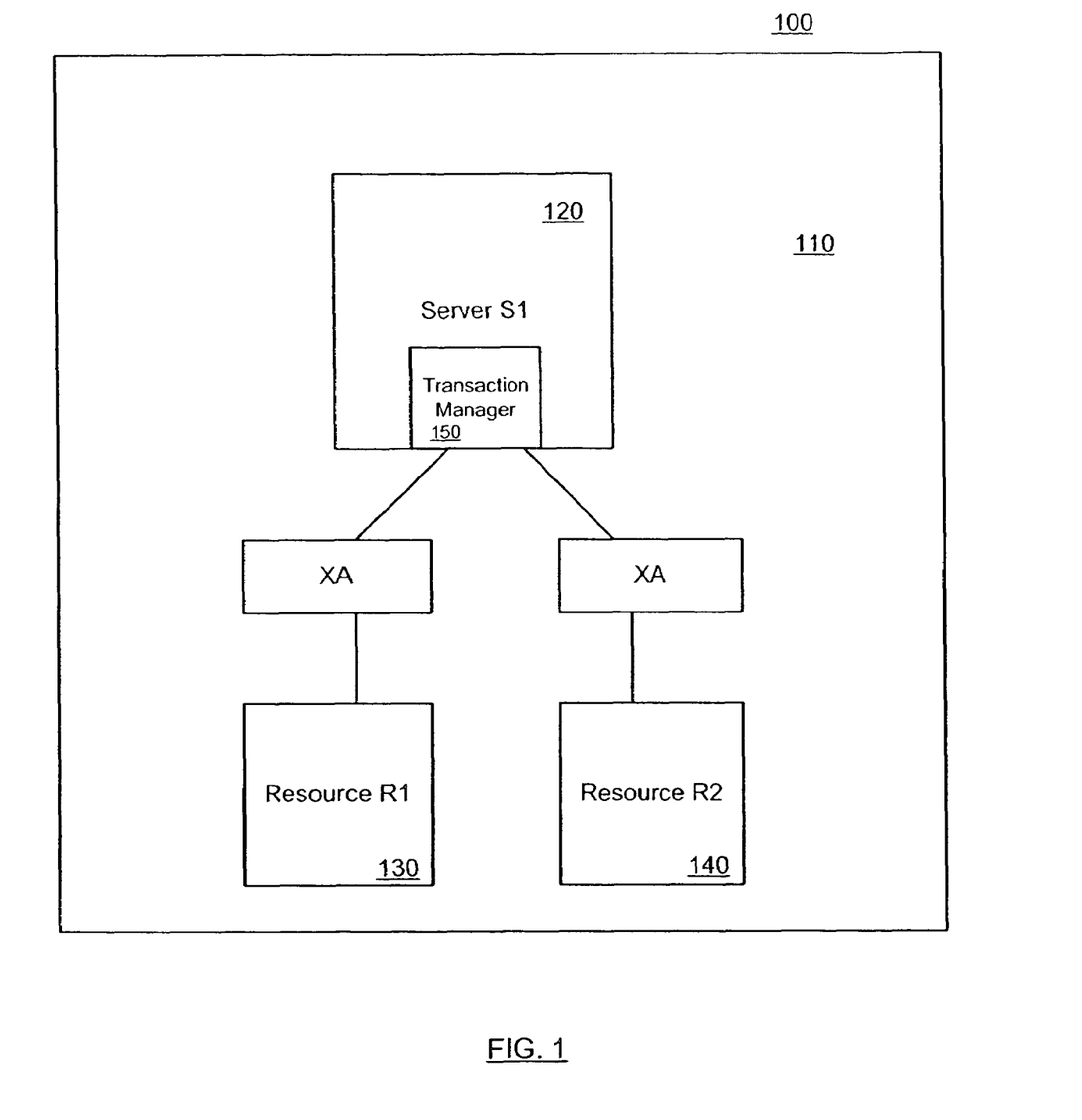
FIG. 1 is an illustration of a system for performing transactions utilizing servers and their resources in accordance with one embodiment of the present invention.

In FIG. 1, an environment for a server computer 110 includes server 120, a first resource 130, and second resource 140. Server 120 includes transaction manager 150. Resources are accessed by an application to perform updates to persistent data. The transaction manager is used to ensure that the updates happen atomically with transactional guarantees. This process is described in more detail in "Open Group Distributed Transactions Processing" by Java Inc, incorporated by reference herein.

Figure 2:
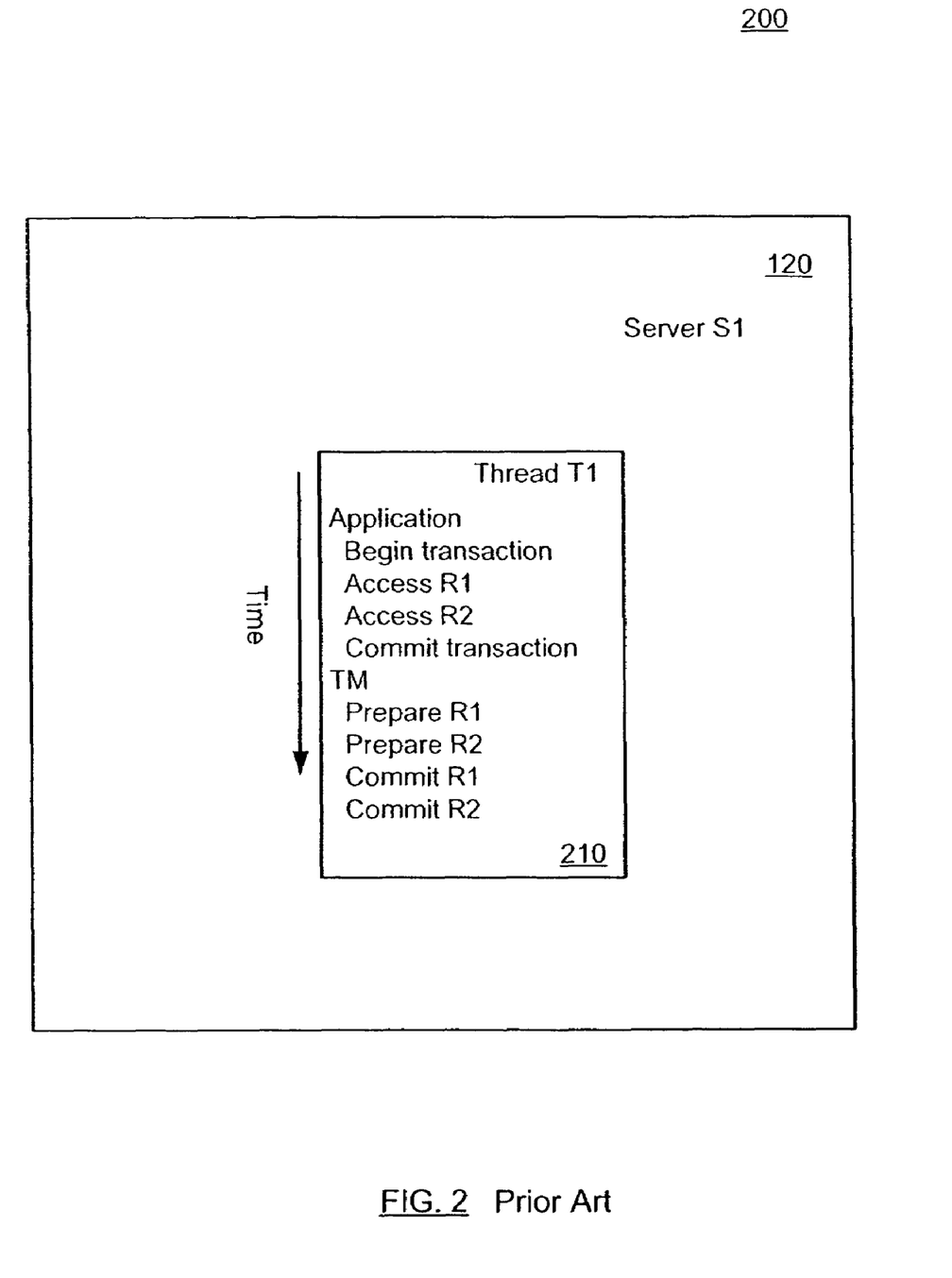
FIG. 2 is an illustration of a serial transaction system having a single thread in accordance with the prior art.

WLS internally manages several thread pools that are used to process application logic, administrative requests, inter-server communication and other operations specific to server management. The TM utilizes server threads to perform various transaction-related operations on behalf of the application such as coordinating transactions across multiple servers, transaction timeout processing, transaction recovery processing, and other operations. System 200 of FIG. 2 illustrates a server thread of the prior art. As shown, a server 120 includes a thread 210. Previously, accessing transactional resources from within a WLS global transaction would cause the TM to perform all resource interactions from within the thread assigned to the application component. Thus, as shown in FIG. 2, the thread 210 includes all interactions such as access resources R1 and R2 , two-phase commit processing which includes preparing resources R1 and R2 and committing resources R1 and R2 . The two transactional resources are registered and accessible to applications.

There are several XA interactions that take place between the TM and a resource during the course of a transaction as prescribed by the JTA specification. With reference to FIGS. 1 and 2, an application may begin a transaction and update resources 130 and 140 on server 120. The application logic is dispatched to a server thread 210 running in server 120. The application thread then starts a transaction, updates resources, and commits the transaction. Within the thread 210, the application updates data in first resource 130 and then a second resource 140.

Figure 3:
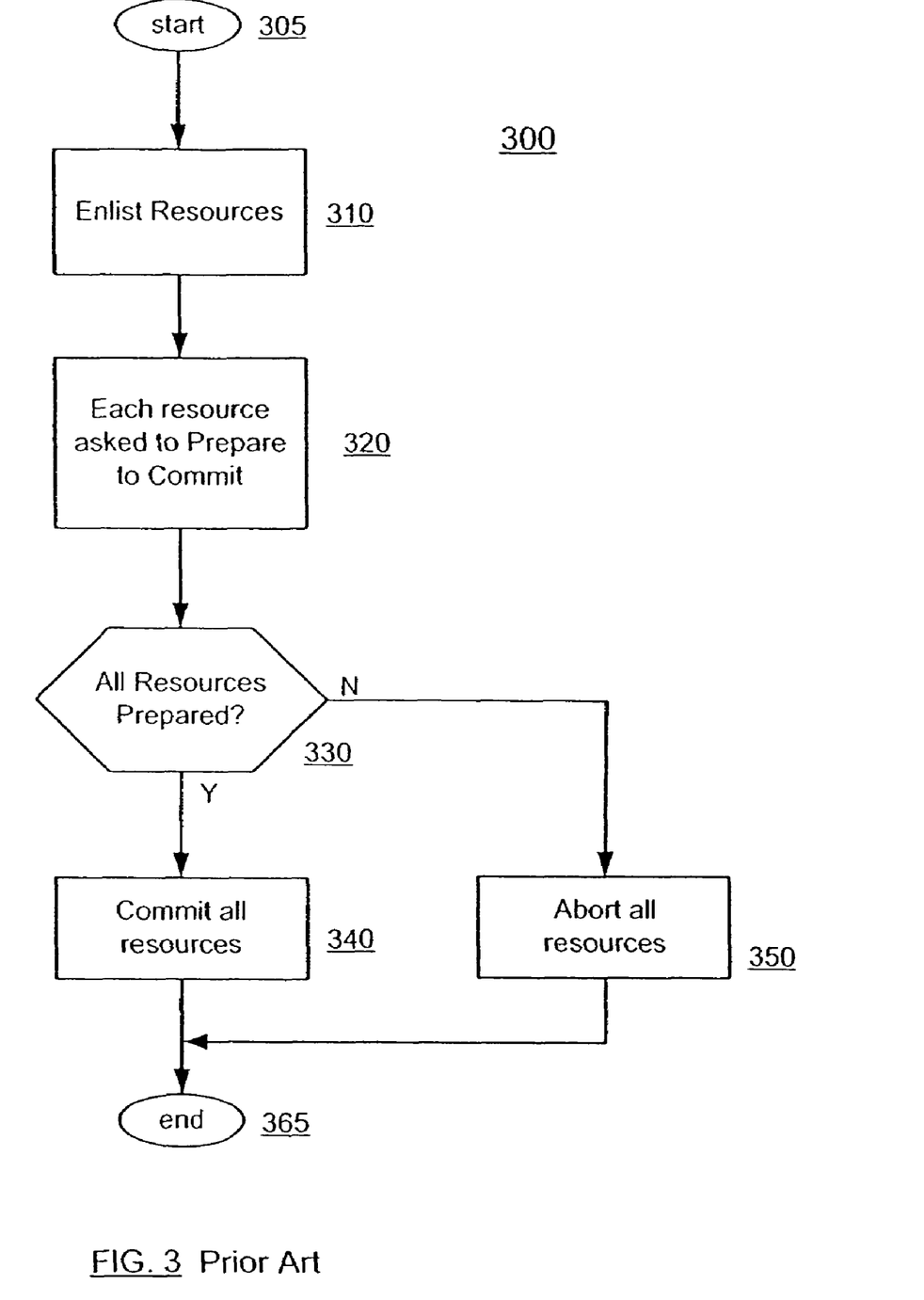
FIG. 3 is an illustration of a method for performing a serial transaction in accordance with the prior art.

A method 300 of the prior art for performing a transaction according to the JTA specification is illustrated in FIG. 3. Method 300 begins with start step 305. Next, resources are enlisted at step 310. Resource enlistment occurs when a resource is accessed within the scope of a transaction and it associates the application's changes with a transaction that is under the control of the TM. Thus, when the application commits the transaction, control of the application thread is given to the TM 150. Next, the participating resources are signaled to prepare to commit in step 320. The TM 150 then sequentially prepares each resource. Each resource is asked by the, TM whether the application changes made under the transaction can be made permanent. The TM then determines if all resources are able to commit at step 330. Once all resources have responded to the prepare directive, the transaction manager will either commit or abort the transaction and inform the resource participants of the outcome. If the resources do not all respond positively to the prepare request, then operation continues to step 350 where the TM aborts the transaction. The application may alternatively issue an abort request for the transaction and the TM will only invoke the rollback operation on the resources. If all resources commit at step 330, the TM issues a commit operation signal and the transaction proceeds at step 340. After the TM signals for either a commit or an abort, operation ends at step 365. The prepare, rollback and commit operations are issued in sequence to each locally-accessible resource that is enlisted in the transaction on any given server that is participating in the transaction. If there are additional servers and resources participating in the transaction then each server would invoke the XA operations serially for those participating resources that are locally accessible.

Performing resource prepare, commit and rollback operations serially as currently done in the prior art can be inefficient since these XA operations may require long processing times. What is needed is a system and method for processing transactions that overcomes the limitations and disadvantages of the prior art.

SUMMARY OF THE INVENTION

In one embodiment of the present invention, a method for utilizing available server threads to process resources and reduce the overall time of performing XA interactions in two-phase commit protocol implemented by the transaction manager (TM) of the present invention. A TM processing XA interactions dispatches interaction commands for multiple resources to idle server threads. In one embodiment, the TM attempts to dispatch all but one of the interaction commands to separate threads. The primary thread then processes the remaining resource command. Any commands relating to dispatch requests that were unable to be dispatched to separate threads due to unavailability are also processed by the primary thread. Once the primary server has processed its interaction commands and received a signal indicating the threads receiving dispatch requests have completed their respective processing of dispatched commands, the next group of commands is processed in a similar manner.

By utilizing available server threads, it is possible to reduce the overall time spent in XA operations when multiple resources are involved in a transaction by performing the XA operations in parallel. Because the methods of the XAResource interface are synchronous, the use of additional threads is required to obtain concurrency. If there are no idle threads available, these operations will be performed in the application's thread.

DETAILED DESCRIPTION

In one embodiment of the present invention, available server threads are utilized to process resources and reduce the overall time for performing XA interactions in two-phase commit protocol implemented by JTA. A TM that processes XA interactions dispatches interaction commands for multiple resources to idle server threads. In one embodiment, the TM attempts to dispatch all but one of the interaction commands to separate threads. The primary thread then processes the remaining resource command. The primary thread may also process any commands relating to dispatch requests that were unable to be dispatched to separate threads. Once the primary server has processed its interaction commands and received a signal indicating the threads receiving dispatch requests have completed their respective processing of dispatched commands, the next group of commands is processed in a similar manner.

By utilizing available server threads, it is possible to reduce the overall time spent in XA operations when multiple resources are involved in a transaction by performing the XA operations in parallel. Because the methods of the XAResource interface are synchronous, the use of additional threads is required to obtain concurrency. In one embodiment of the present invention, if there are N resources enlisted in a transaction, the TM commit/rollback logic will schedule requests to prepare/commit/rollback for the resources numbered 2 through N, where N>1. This provides the potential of all but one of the resource transactions to be dispatched to other threads. If there are no idle threads available, these operations will be performed sequentially in the application's thread.

Figure 4:
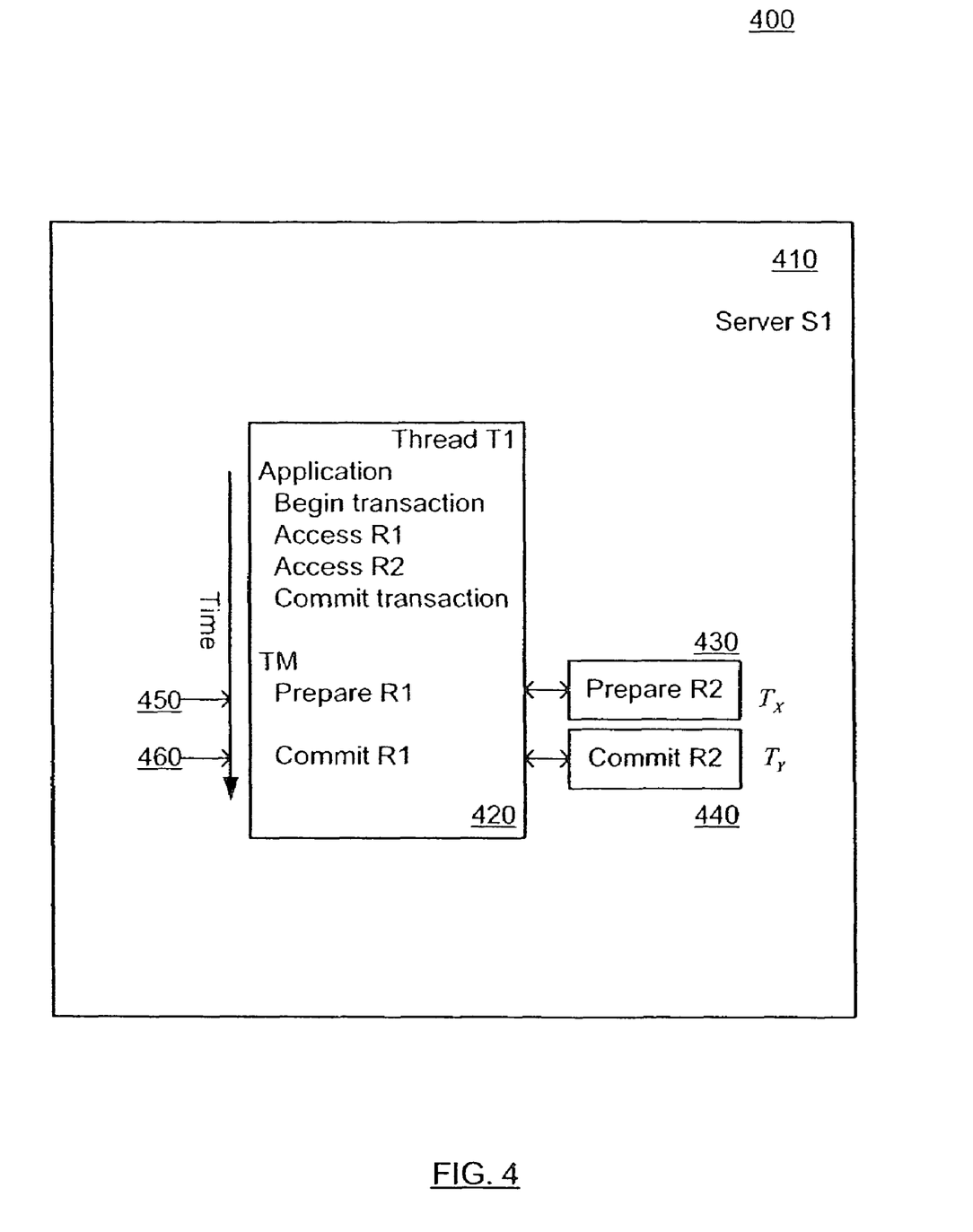
FIG. 4 is an illustration of a parallel transaction system utilizing multiple threads in accordance with one embodiment of the present invention.

System 400 of FIG. 4 illustrates a server wherein transactions are processed in parallel. System 400 includes server 410, a primary thread 420, $T_1$, thread $T_X$ 430, and thread $T_Y$ 440. Primary thread 420 includes resource access commands, a prepare and a commit command for resource one. Thread $T_X$ 430 includes a prepare command for resource two. Thread $T_Y$ 440 includes a commit command for resource two. As indicated by the time line adjacent to primary thread 420, the commands in the primary thread are processed sequentially in time, but in parallel with commands in thread 430 and thread 440.

In the present invention, the application thread drives the two phase-commit protocol. If there is more than one local resource participant for the server, the TM will attempt to dispatch resources 2-N to available threads for execution. The request may be executed in the primary thread if there are no idle threads available. After requests for resources 2 through N have been dispatched, the primary thread will perform the XA operation for resource 1 ($R_1$). After the $R_1$ operation completes, the primary thread will wait until each dispatched resource request has completed and signaled the primary thread. Thus, as shown in system 400, the prepare $R_1$ command and prepare $R_2$ command are performed by threads $T_1$ and $T_X$ threads, respectively. The TM does not continue the operation of the thread $T_1$ and process the commit $R_1$ command until the Prepare $R_2$ command has completed and signaled the primary thread $T_1$.

Figure 5:
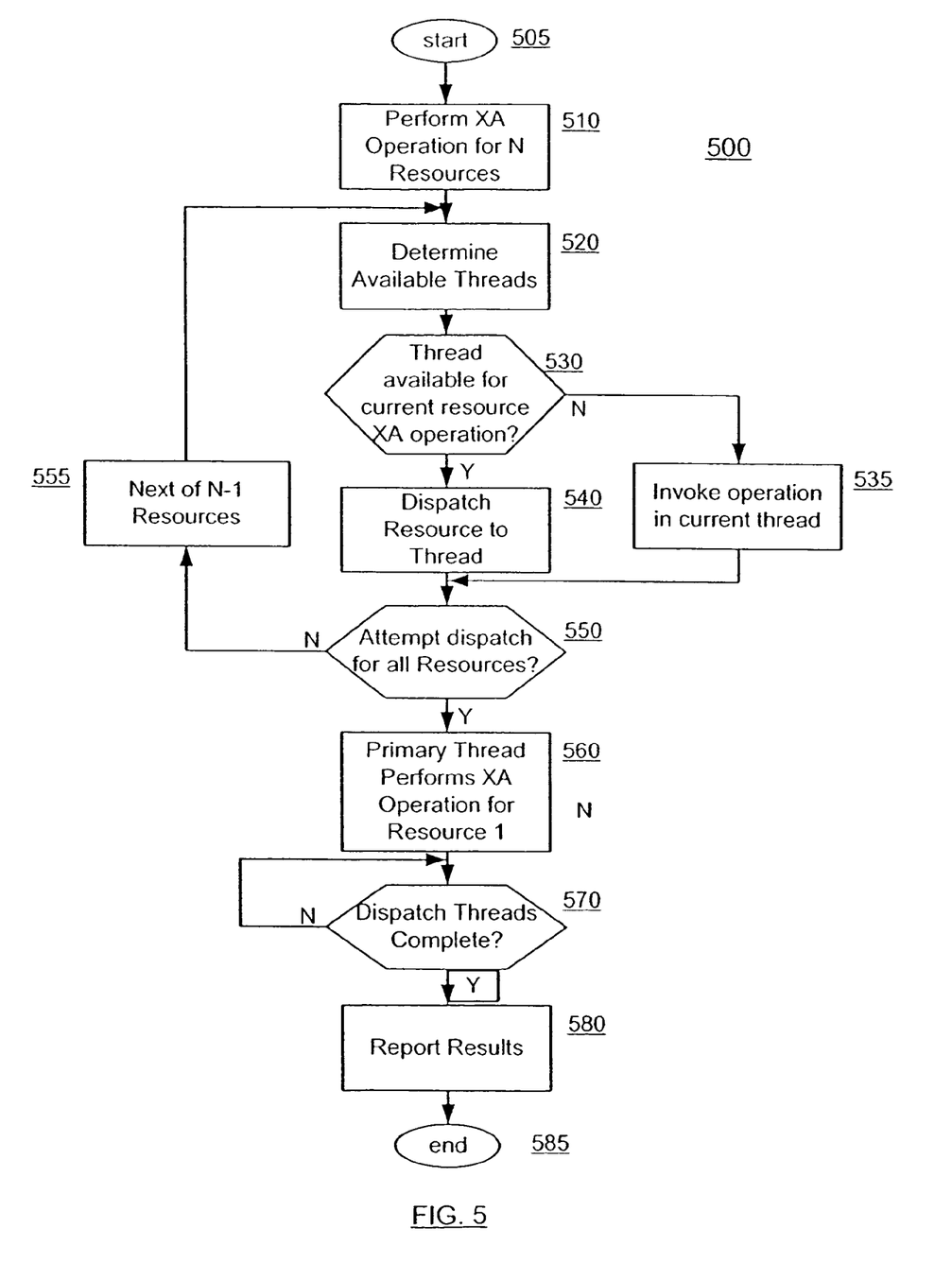
FIG. 5 is an illustration of a method for performing a parallel transaction in accordance with one embodiment of the present invention.

The parallel processing of the present invention is further illustrated in method 500 of FIG. 5. Method 500 begins with start step 505. The method of FIG. 5 may be used to invoke several types of XA operations, including resource prepare, commit, and rollback operations. As discussed above, the XA operation type is processed for each resource before processing of the next XA operation begins. The XA operation to be performed depends upon the phase in the two-phase commit protocol being processed. Step 510 signifies that an XA operation associated with a phase of the two-phase commit protocol is selected to be processed. The number and identity of available threads is determined at step 520. In one embodiment, the transaction manager, or TM, provides tasks to the thread pool manager. The thread pools maintained by the server system are then checked to determine which threads are idle. Information for idle threads within the thread pool are determined by the thread manager. Next, the thread pool manager determines if there is an available thread for the current resource XA transaction at step 530. If an idle thread does not exist, operation continues to step 535 wherein the request may be immediately invoked in the current thread or caller's thread as a blocking operation. In this case, the thread pool manager processes the work in the current thread. Thus, when there are no idle threads, the transaction operations are performed in sequence. In yet another embodiment, a dedicated thread pool is used for parallel transaction operations. In this case, instead of using a default thread pool to dispatch transaction operations for idle threads, operations are dispatched to a separate, dedicated pool used for transaction operation. After the operation is invoked in the current thread, operation of method 500 continues to step 550.

If a thread is available at step 530, operation continues to step 540 wherein the thread manager dispatches the XA operation to the available thread. Operation then continues to step 550. In one embodiment, only the XA operation for each resource is dispatched. For example, as shown in system 400 of FIG. 4, prepare to commit transactions are handled at the time indicated by indicator 450. At that time, the prepare operations are handled by primary thread 420 for the first resource and thread 430 for the second resource.

At step 550, if the TM has attempted to dispatch the current XA operation of all N−1 resources in the transaction, operation continues to step 560. If there are more XA operations, the next resource is addressed as indicated in step 555 and operation continues for the resource at step 520. At step 560, the primary thread then processes the XA operation for resource 1.

After the primary thread has processed the XA operations in step 560, the primary thread determines if the threads that received dispatches in step 560 have signaled the primary thread at step 570. In one embodiment, the primary thread determines if the respective threads have signaled the primary thread to indicate their respective commands have been processed. In one embodiment, operation remains at step 570 until all threads receiving dispatched commands have signaled the primary thread. In another embodiment, the primary thread will wait for a pre-determined period of time during which the threads receiving dispatches may signal the primary thread. In this embodiment, if the threads do not signal the primary thread within the time period, a time-out error is logged. If the TM is processing the prepare phase of the two phase commit protocol, then the transaction may be aborted. Once all threads processing dispatched requests have signaled the primary thread, the TM reports results of the XA operation at step 580. Operation then ends at step 585.

In one embodiment of the present invention, the signaling mechanism is based on a JAVA® class that maintains a counter of the number of signal events anticipated. The primary thread will invoke a wait method that blocks the caller until the object is signaled the set number of times. The modified prepare/commit/rollback algorithms sets the expected number of signal events to be N−1. Each request that is dispatched to a thread for execution is given a reference to the synchronization object. Upon completing the XA operation the thread will invoke the object's signal method before terminating.

Figure 6:
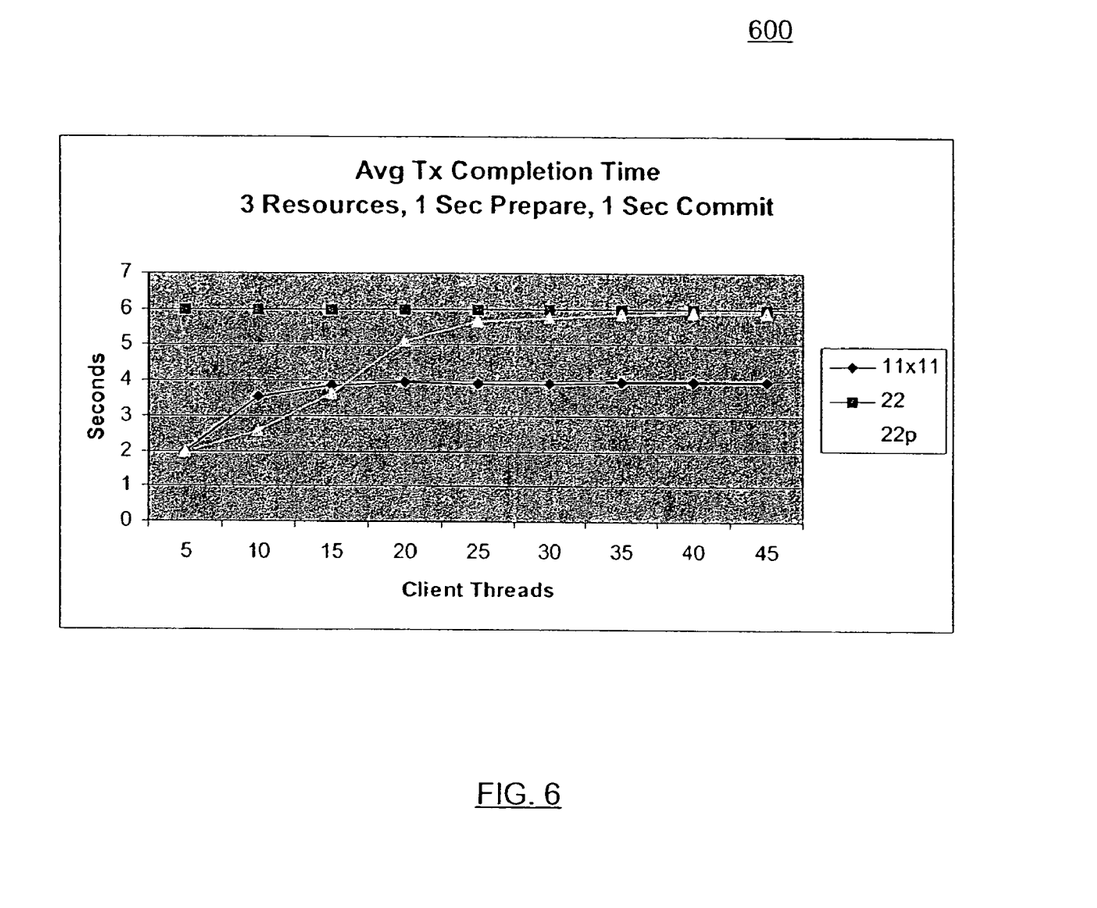
FIG. 6 is an illustration of the average completion time of a transaction in accordance with one embodiment of the present invention.
Figure 7:
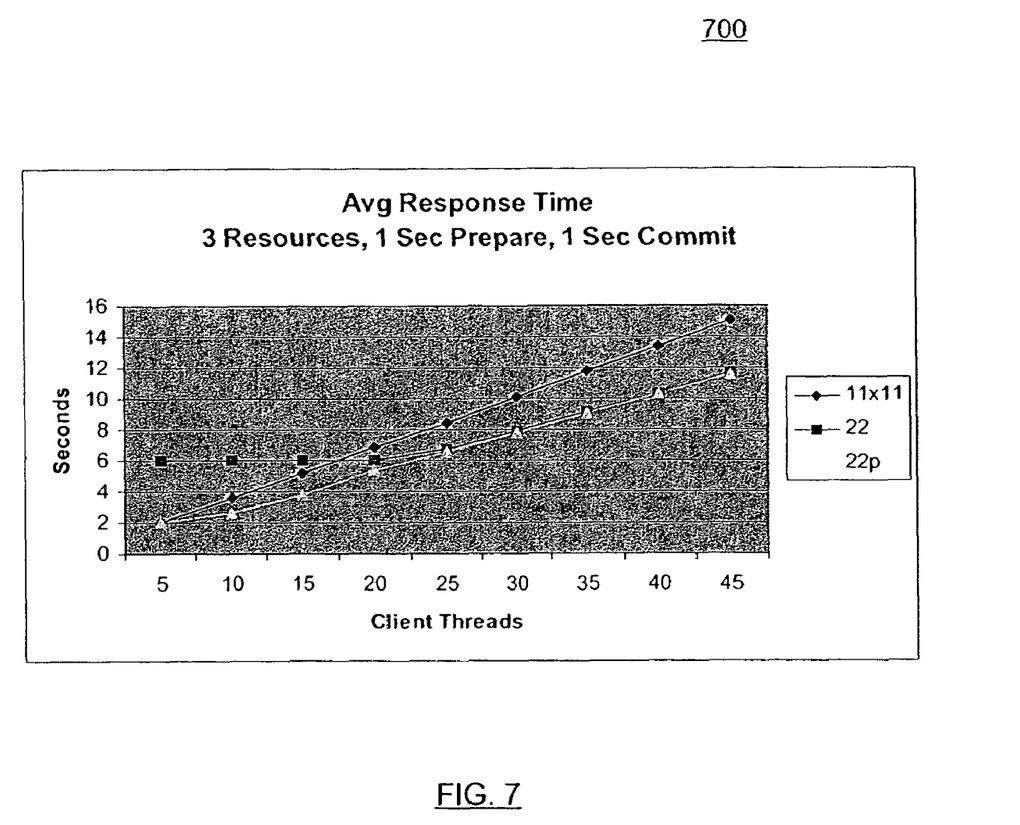
FIG. 7 is an illustration of the average response time of a transaction in accordance with one embodiment of the present invention.
Figure 8:
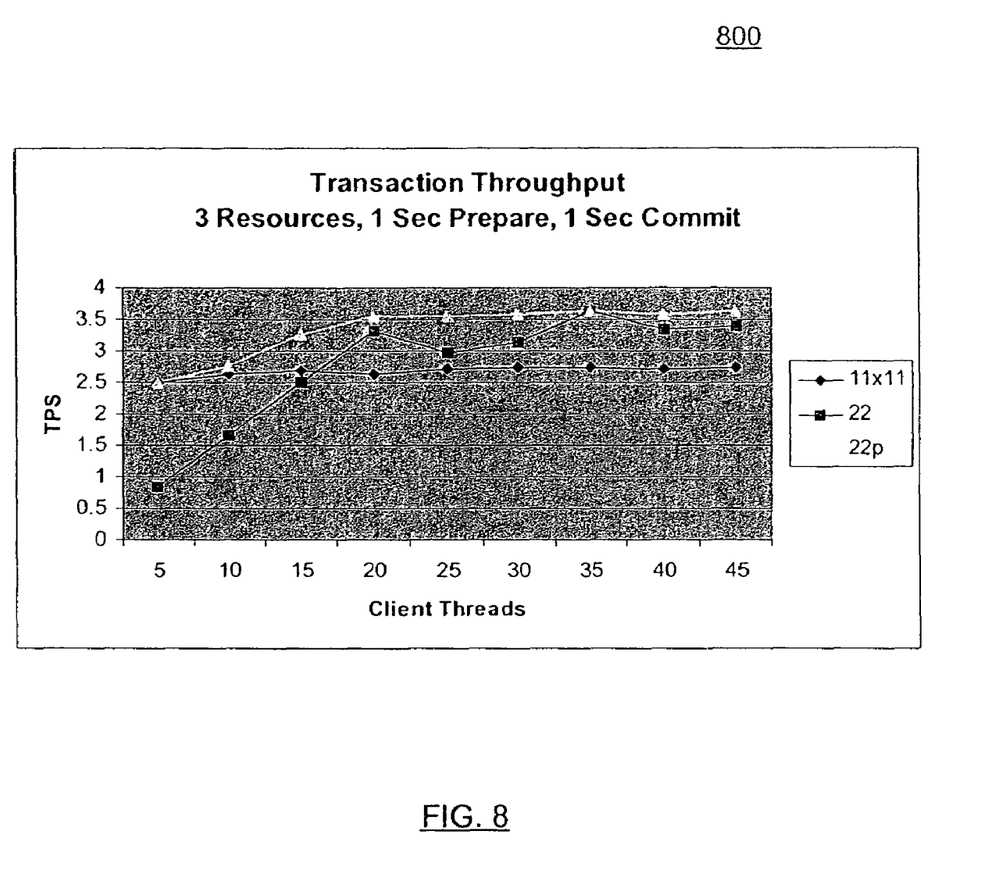
FIG. 8 is an illustration of the transaction throughput time in accordance with one embodiment of the present invention.

FIGS. 6-8 illustrate data corresponding to traits of the present invention. In FIGS. 6-8, data plots corresponding to three types of XA interaction processing implementations are provided. For each plot, the server is assumed to have three resources, a one second prepare to commit time, and a one second commit time. The darkest plot containing interspersed diamond icons represents the results of 11 free default queue threads and 11 dedicated XA threads. The second darkest plot containing interspersed squares represents 22 free default queue threads. This second darkest plot most resembles the serial processing technique of the prior art. The lightest plot containing interspersed triangles includes 22 free default queue threads, wherein parallel transactions are implemented in the default queue threads if one or more threads are idle.

FIG. 6 illustrates a plot of the average transmission completion time in seconds for varying numbers of client threads used by applications. For low numbers of client threads being used, the parallel transaction processing system provides for much faster processing and better thread utilization than the serial processing technique. As the number of threads in use by a server increase, the average transaction completion time improvement of the parallel processing method over the serial processing method slowly decreases. FIG. 7 illustrates a plot of the average response time. For low numbers of client threads being used, the parallel transaction processing system provides for much faster average response time than the serial processing technique. As the number of threads in use by a server increase, the average response time improvement of the parallel processing method over the serial processing method slowly decreases. FIG. 8 illustrates a plot of the transaction throughput characteristic of the three processing systems. For low numbers of client threads being used, the parallel transaction processing system provides for transactions completed per second than the serial processing technique. As the number of threads in use by a server increase, the transactions per second improvement of the parallel processing method over the serial processing method slowly decreases.

As indicated in FIGS. 6-8, server performance improves with the use of the parallel XA feature when client loads are light to moderate. This is due to the utilization of otherwise idle threads. For heavy client loads, where all server threads are being utilized for processing client requests, the behavior and performance is similar to that of serialized XA in that the primary thread processes most of the XA related interactions.

In one embodiment of the present invention, available server threads are utilized to process resources and reduce the overall time of performing XA interactions in two-phase commit protocol implemented by the TM of the present invention. A TM that processes XA interactions dispatches interaction commands for multiple resources to idle server threads. In one embodiment, the TM attempts to dispatch all but one of the interaction commands for current command. The primary thread then processes the remaining resource command as well as any commands relating to dispatch requests that failed. Once the primary server has processed its interaction commands and received a signal indicating the threads receiving dispatch requests have completed their respective processing of dispatched commands, the next group of commands is processed in a similar manner.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, parallel processing of XA interactions in a JTA environment.

The invention claimed is:

1. A method for implementing a two-phase commit protocol, comprising:
    associating, via a transaction manager, a plurality of resources in a transaction, wherein the plurality of resources are applied in the transaction using a prepare phase and a commit phase, wherein the prepare phase comprises a plurality of prepare operations, each of which is associated with one of the plurality of resources, and wherein the commit phase comprises a plurality of commit operations, each of which is also associated with one of the plurality of resources;
    dispatching, via a thread pool manager, a second prepare operation from a first server thread to a second server thread, wherein the second prepare operation is associated with a second resource and the prepare phase, and the second prepare operation is executed by sending a preparation instruction from the second server thread to the second resource;
    processing a first prepare operation by the first server thread in parallel to the second prepare operation being processed by the second server thread, wherein the first prepare operation is associated with a first resource and the prepare phase, and the first prepare operation is executed by sending another prepare instruction from the first server thread to the first resource;
    determining, via the thread pool manager, that the prepare phase is complete when both the first prepare operation and the second prepare operation are completed;
    after determining that the prepare phase is complete, dispatching, via the thread pool manager, a second commit operation from the first server thread to a third server thread, wherein the second commit operation is associated with the second resource and the commit phase, and the second commit operation is executed by sending a commit instruction from the third server thread to the second resource;
    processing a first commit operation by the first server thread in parallel to the second commit operation being processed by the third server thread, wherein the first commit operation is associated with the first resource and the commit phase, and the first commit operation is executed by sending another commit instruction from the first server thread to the first resource; and
    determining, via the thread pool manager, that the commit phase is complete when both the first commit operation and the second commit operation are completed.

2. The method of claim 1 further comprising:
    selecting an idle server thread to process the first prepare operation.

3. The method of claim 2, wherein selecting includes:
    determining available server threads in a server.

4. The method of claim 3 wherein the thread pool manager determines the available server threads in the server.

5. The method of claim 1 further comprising:
    reporting results of the prepare phase to a log.

6. The method of claim 1, wherein a dedicated thread pool is used for parallel transaction operations.

7. The method of claim 1, wherein a transaction manager implements JAVA® Transaction API.

8. The method of claim 1, wherein the first resource is an XA resource.

9. The method of claim 1, wherein all of the prepare operations and all of the commit operations are part of a single transaction.

10. A method for processing a two-phase commit protocol operations, comprising:
    associating, via a transaction manager, a plurality of resources in a transaction, wherein the plurality of resources are applied in the transaction using a prepare phase and a commit phase, wherein the prepare phase comprises a plurality of prepare operations, each of which is associated with one of the plurality of resources, and wherein the commit phase comprises a plurality of commit operations, each of which is also associated with one of the plurality of resources;
    processing, via a thread pool manager, the plurality of prepare operations in a first server thread, wherein the processing of each prepare operation of the plurality of the prepare operations comprises:
        dispatching the prepare operation to another server thread if the another thread is available; and
        processing the prepare operation in the first server thread if no other server thread is available;
    determining, via the thread pool manager, that the prepare phase is complete, when every one of the plurality of prepare operations completes;
    after determining that the prepare phase is complete, processing the thread pool manager, the plurality of commit operations in a first server thread, wherein the processing of each commit operation of the plurality of the commit operations comprises:
        dispatching the commit operation to another server thread if another server thread is determined to be available;
        processing the commit operation in the first server thread if no other server thread is available; and
    determining, via the thread pool manager, that the commit phase is complete, when every one of the plurality of commit operations completes.

11. The method of claim 10 wherein the thread pool manager determines the available server threads in the server.

12. The method of claim 10 further comprising:
reporting results of the plurality of prepare operations associated with the prepare phase to a log.

13. The method of claim 10, wherein each prepare operation of the plurality of the prepare operations is associated with an XA resource.

14. The method of claim 10, wherein a dedicated thread pool is used for parallel transaction operations.

15. The method of claim 10, wherein the transaction manager implements JAVA® Transaction API.

16. The method of claim 10, wherein all of the prepare operations and all of the commit operations are part of a single transaction.

17. A system, comprising:
one or more processors;
a transaction manager, wherein the transaction manager associates a plurality of resources in a transaction, wherein the plurality of resources are applied in the transaction using a prepare phase and a commit phase, wherein the prepare phase comprises a plurality of prepare operations, each of which is associated with one of the plurality of resources, and wherein the commit phase comprises a plurality of commit operations, each of which is also associated with one of the plurality of resources; and
a dedicated thread pool, on a server machine, for parallel transaction operations, including:
a first server thread, wherein the first server thread processes a first prepare operation, and wherein the first prepare operation is associated with a first resource and the prepare phase;
a second server thread, wherein the first server thread dispatches a second prepare operation to the second server thread, wherein the second prepare operation is associated with a second resource and the prepare phase and processed by the second server thread in parallel to the first prepare operation being processed by the first server thread; and
a third server thread, wherein after the transaction manager determines that the prepare phase is complete, the first server thread processes a first commit operation associated with the first resource, and the first server thread dispatches to the third server thread a second commit operation associated with the second resource, wherein the second commit operation is processed by the third server thread in parallel to the first commit operation being processed by the first server thread.

18. The system of claim 17 further comprising:
a thread pool manager, wherein the thread pool manager determines available server threads.

19. The system of claim 17 further comprising:
a transaction log, wherein the transaction log records results of the prepare phase and the commit phase.

* * * * *

UNITED STATES PATENT AND TRADEMARK OFFICE
CERTIFICATE OF CORRECTION

PATENT NO. : 7,640,535 B2
APPLICATION NO. : 10/762944
DATED : December 29, 2009
INVENTOR(S) : Alexander J. Somogyi et al.

It is certified that error appears in the above-identified patent and that said Letters Patent is hereby corrected as shown below:

Title Page, Item (*) Notice: Delete "969 days" and insert -- 1471 days --.

In column 1, line 53-61, Delete "In FIG. 1, an environment for a server computer 110 includes server 120, a first resource 130, and second resource 140. Server 120 includes transaction manager 150. Resources are accessed by an application to perform updates to persistent data. The transaction manager is used to ensure that the updates happen atomically with transactional guaranties. This process is described in more detail in "Open Group Distributed Transactions Processing" by Java Inc, incorporated by reference herein." and insert the same on Col. 1, line 52 after "Fig. 1." as a continuation of the same paragraph.

In column 8, line 53-54, in claim 10, Delete "processing" and insert -- processing, via --, therefor.

Signed and Sealed this

Fourteenth Day of September, 2010

David J. Kappos
*Director of the United States Patent and Trademark Office*